Oct. 4, 1927.
E. F. BENOIT
1,644,629
BRAKE BAND COUPLING
Filed Dec. 9, 1924
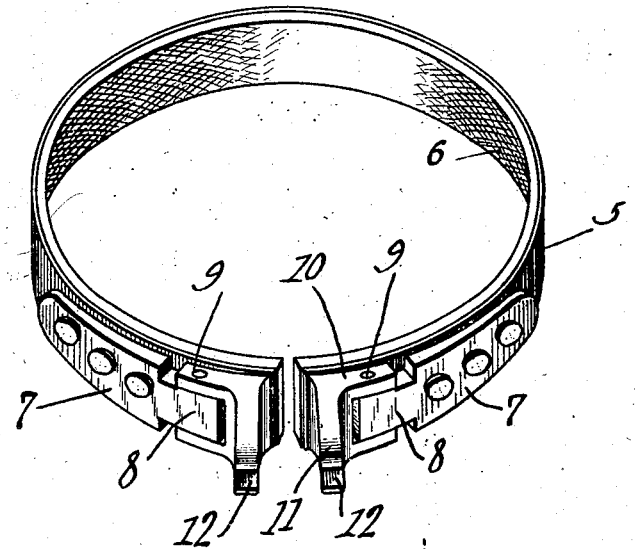
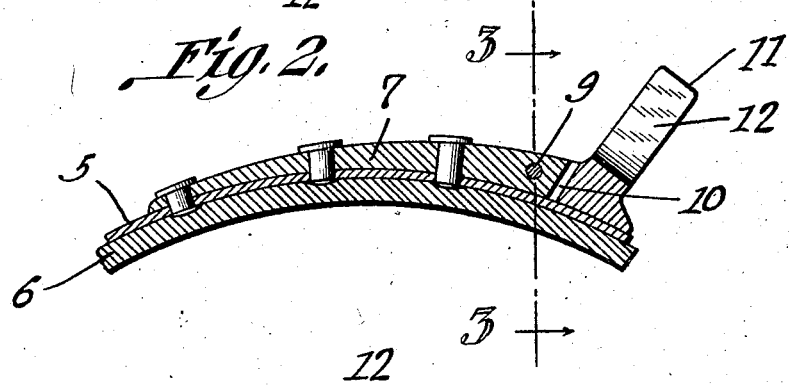
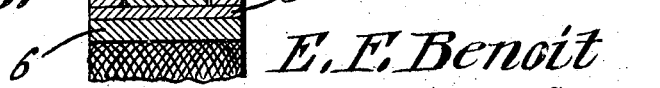
E. F. Benoit
Inventor Patented Oct. 4, 1927.

1,644,629

UNITED STATES PATENT OFFICE.

ELPHEGE F. BENOIT, OF SEATTLE, WASHINGTON.

BRAKE-BAND COUPLING.

Application filed December 9, 1924. Serial No. 754,812.

The present invention has reference to motor vehicle brake bands, the primary object of the invention being to provide novel means whereby the band lugs may be removed to permit the band to be readily threaded through the transmission housing, eliminating the necessity of disassembling the transmission housing to position the brake band.

Another object of the invention is to provide a device of this character which may be manufactured at comparatively little cost, and one which may be operated with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a perspective view of a brake band constructed in accordance with the invention.

Figure 2 is a fragmental sectional view of one end of the band, and

Figure 3 is a sectional view taken on line 3—3 of Figure 2.

Referring to the drawing in detail, the reference character 5 indicates the band, which is of the usual construction, the same being formed of flexible material to permit the band to expand and contract to accomplish its purpose.

The reference character 6 indicates the brake lining which is of the usual construction and secured to the band, in any well known manner.

Riveted or otherwise secured to the band, at points adjacent to the ends of the band are fastening members 7 which are formed with reduced portions 8 that are provided with transversely disposed openings designed to accommodate the bolts 9. These bolts also pass through the bifurcated portions 10 of the lugs 11, it being understood that the reduced portions 8 of members 7 in operation, are secured between the furcations of the lugs 11.

These lugs are of the usual construction, provided with cut out portions 12 through which the usual bolts extend that have connection with the operating mechanism for moving the split ends of the band towards or away from each other.

From the foregoing it will be obvious that due to this construction, the bolts 9 may be readily removed to disconnect the lugs 11, thereby providing a band structure which may be readily slid into position through the transmission housing, eliminating the necessity of taking down the transmission housing in order to install the band.

After the band has been properly positioned, the lugs 11 may be readily positioned over the reduced portions 8 of the member 7 and the operating bolts not shown, positioned, to complete the structure.

I claim:—

In a brake band, a split body portion, fastening members mounted adjacent to the ends of the band, said fastening members having reduced end portions, securing lugs having furcations and having curved portions resting on the band, said furcations adapted to fit on opposite sides of the reduced portions, bolts extending through the reduced end portions and through the furcations to pivotally connect the securing lugs to the fastening members, and said lugs having cut out portions to receive the usual clutch band bolts.

In testimony that I claim the foregoing as my own, I have hereto affixed my signature.

ELPHEGE F. BENOIT.